US009219371B2

(12) United States Patent
Lee

(10) Patent No.: US 9,219,371 B2
(45) Date of Patent: Dec. 22, 2015

(54) APPARATUS AND METHOD FOR CHARGING A BATTERY PACK

(71) Applicant: Samsung Electronics Co., Ltd, Gyeonggi-do (KR)

(72) Inventor: Ju-Hwan Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 13/681,331

(22) Filed: Nov. 19, 2012

(65) Prior Publication Data

US 2013/0162209 A1    Jun. 27, 2013

(30) Foreign Application Priority Data

Dec. 26, 2011    (KR) .......................... 10-2011-0142221

(51) Int. Cl.
*H02J 7/00*    (2006.01)
*G06F 1/16*    (2006.01)
*G06F 1/26*    (2006.01)

(52) U.S. Cl.
CPC ............. *H02J 7/0052* (2013.01); *G06F 1/1635* (2013.01); *G06F 1/26* (2013.01); *H02J 7/0045* (2013.01)

(58) Field of Classification Search
CPC .... Y02E 60/12; H01M 2/1055; H01M 10/46; H01M 10/425; H02J 7/0045
USPC .......................................................... 320/112
See application file for complete search history.

(56) References Cited

U.S. PATENT DOCUMENTS

| | | | | |
|---|---|---|---|---|
| 5,835,989 | A | * | 11/1998 | Nagai ............................ 307/116 |
| 6,397,087 | B1 | * | 5/2002 | Kim et al. ................... 455/569.1 |
| 6,552,512 | B1 | | 4/2003 | Harris |
| 2005/0116684 | A1 | * | 6/2005 | Kim .............................. 320/114 |
| 2006/0152191 | A1 | * | 7/2006 | Lee et al. ...................... 320/106 |
| 2008/0054854 | A1 | | 3/2008 | Wong et al. |

(Continued)

FOREIGN PATENT DOCUMENTS

| | | |
|---|---|---|
| CN | 200987161 | 12/2007 |
| CN | 101136553 | 3/2008 |
| CN | 201349214 | 11/2009 |
| CN | 201657073 | 11/2010 |

(Continued)

OTHER PUBLICATIONS

First Office Action dated Jul. 24, 2014 in connection with Chinese Application No. 201210444140.9, 12 pages.

*Primary Examiner* — Arun Williams

(57) ABSTRACT

According to certain embodiments, an apparatus and method for charging a battery pack for an electronic apparatus includes an earphone connection unit, a charge determining switching unit, a charge circuit, and a control unit. The earphone connection unit is configured to be connected to the electronic apparatus to selectively receive one of an earphone unit for an earphone mode and the spare battery pack for a charge mode. The charge determining switching unit is configured to switch to one of the earphone mode and the charge mode according to the unit connected electrically to the earphone connection unit. The charge circuit is configured to open a charge path for charging the spare battery pack with an external voltage applied to the electronic apparatus, according to the switching of the charge determining switching unit. The control unit is configured to measure a resistance value of the spare battery pack applied to the charge determining switching unit, switches the mode, and opens the charge circuit.

16 Claims, 7 Drawing Sheets

(56) References Cited

U.S. PATENT DOCUMENTS

2011/0171860 A1    7/2011  Li
2012/0239957 A1*   9/2012  Hsiao et al. .................. 713/340

FOREIGN PATENT DOCUMENTS

CN        102123333        7/2011
KR    10-2007-0010638      1/2007

* cited by examiner

APPARATUS AND METHOD FOR CHARGING A BATTERY PACK

CROSS-REFERENCE TO RELATED APPLICATION(S) AND CLAIM OF PRIORITY

The present application is related to and claims priority under 35 U.S.C. §119 to an application filed in the Korean Intellectual Property Office on Dec. 26, 2011 and assigned Serial No. 10-2011-0142221, the contents of which are incorporated herein by reference.

TECHNICAL FIELD OF THE INVENTION

The present invention relates generally to batteries, and more particularly, to an apparatus and method for charging a battery pack.

BACKGROUND OF THE INVENTION

In general, various electronic apparatuses, such as tablet computers, handheld computers, personal digital assistants (PDAs), cellular telephones, network appliances, cameras, smart phones, and enhanced general packet radio service (EGPRS) mobile terminals, are equipped with a battery pack that supplies electrical power.

Such an electronic apparatus may be powered with a battery pack mounted inside its housing that is not intended to be detached therefrom (a battery cell state). Thus, when needing to be charged, the battery pack may be charged by electrically connecting a charger directly to a connector port of the electronic apparatus.

However in many cases, such a built-in battery pack is not replaceable, and a user is inconvenienced by having to visit a service center in order to replace the expendable battery pack after a useful life of the battery pack.

Recently, battery packs have been configured to be detachably disposed at a particular position of an electronic apparatus (generally, at a rear side of the electronic apparatus). When a purchaser purchases an electronic apparatus such as a portable terminal, the purchaser is provided with a spare battery pack and a battery charger (BTC) for charging the spare battery pack separately from the electronic apparatus. Therefore, a user can carry a fully-charged spare battery pack together with its associated electronic apparatus, and use the electronic apparatus (portable terminal) for a long period even during movement or travel by simply replacing the battery pack, which is currently installed in the electronic apparatus, with the spare battery pack when the currently-installed battery pack is discharged.

On the other hand, in order to charge the battery pack of the electronic apparatus during travel, the user should carry a traveler adapter (TA) and a charger for charging the spare battery pack. However, the user is often inconvenienced by having to carry the charger. Also, the manufacturing cost is increased because a manufacturer is required to provide a purchaser with a separate charger for charging a spare battery pack.

SUMMARY OF THE INVENTION

To address the above-discussed deficiencies of the prior art, it is a primary object to provide an apparatus and method for charging a battery pack, which can charge a spare battery without a separate charger.

Another object of the present invention is to provide an apparatus and method for charging a battery pack, which can improve the portability and eliminate the risk of loss.

Another object of the present invention is to provide an apparatus and method for charging a battery pack, which can reduce manufacturing costs.

Another object of the present invention is to provide an apparatus and method for charging a battery pack, which can improve convenience of its use.

Another object of the present invention is to provide an apparatus and method for charging a battery pack, which can directly charge a spare battery pack without using a separate charger by providing a charge circuit in a portable terminal and adding a battery pack connection structure to an earphone connection unit.

According to an aspect of the present invention, an apparatus for charging a spare battery pack for an electronic apparatus includes: an earphone connection unit configured to be connected to the electronic apparatus to selectively receive one of an earphone unit for an earphone mode and the spare battery pack for a charge mode; a charge determining switching unit configured to switch one of the earphone mode and the charge mode according to the unit connected electrically to the earphone connection unit; a charge circuit configured to open a charge path for charging the spare battery pack with an external voltage applied to the electronic apparatus, according to the switching of the charge determining switching unit; and a control unit configured to measure a resistance value of the spare battery pack applied to the charge determining switching unit, switching the mode, and open the charge circuit.

The apparatus may further include a charge current determining switching unit that is configured to adjust a charge current to charge the spare battery pack together with an internal battery pack of the electronic apparatus when the spare battery pack is connected to the earphone connection unit.

A protection circuit may be further disposed on the charge path that is configured to charge the spare battery pack, such that a power path may not be connected even when a charge terminal is exposed.

In the earphone connection unit, a portion for connection of the earphone unit and a portion for connection of the spare battery pack may have the same structure, or may be disposed at different positions.

When the above connection portions are disposed at different positions, the earphone connection unit may include: a body; unit terminals installed at a terminal contact side of the body, corresponding to terminals of the spare battery pack; and an ear jack hole installed at a side of the body to receive an ear jack of the earphone unit.

The apparatus may further include a connection guiding unit disposed at the terminal contact side that is configured to provide a relatively accurate connection between terminals of the earphone connection unit and the terminals of the spare battery pack. The connection guiding unit can include at least one seating protrusion that may protrude from the terminal contact side to a predetermined height and may be seated in a seating groove formed at a terminal installation side of the spare battery pack.

The apparatus may further include a fixing unit configured to fix the earphone connection unit to the spare battery pack in a charge operation. The fixing unit can include at least one magnet that is disposed on the terminal contact side of the earphone connection unit, and the earphone connection unit and the spare battery pack can be fixed by a magnetic force between the at least one magnet and a magnet disposed at the terminal installation side of the spare battery pack.

A cover may be further installed at the terminal contact side of the earphone connection unit to protect the unit terminals when the earphone connection unit is used in the earphone mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable devices. Example embodiments of the present invention will be described herein below with reference to the accompanying drawings. However, detailed descriptions of well-known functions or configurations will be omitted since they would unnecessarily obscure the subject matters of the present invention.

In the following description of the present invention, examples of an electronic apparatus may include not only portable terminals but also various electronic apparatuses such as tablet computers, handheld computers, personal digital assistants (PDAs), cellular telephones, network appliances, cameras, smart phones, and enhanced general packet radio service (EGPRS) mobile terminals. For example, according to the present invention, a battery pack may be detachably installed on an electronic apparatus, and it may be applicable to various devices having a spare battery pack.

Figure 1:
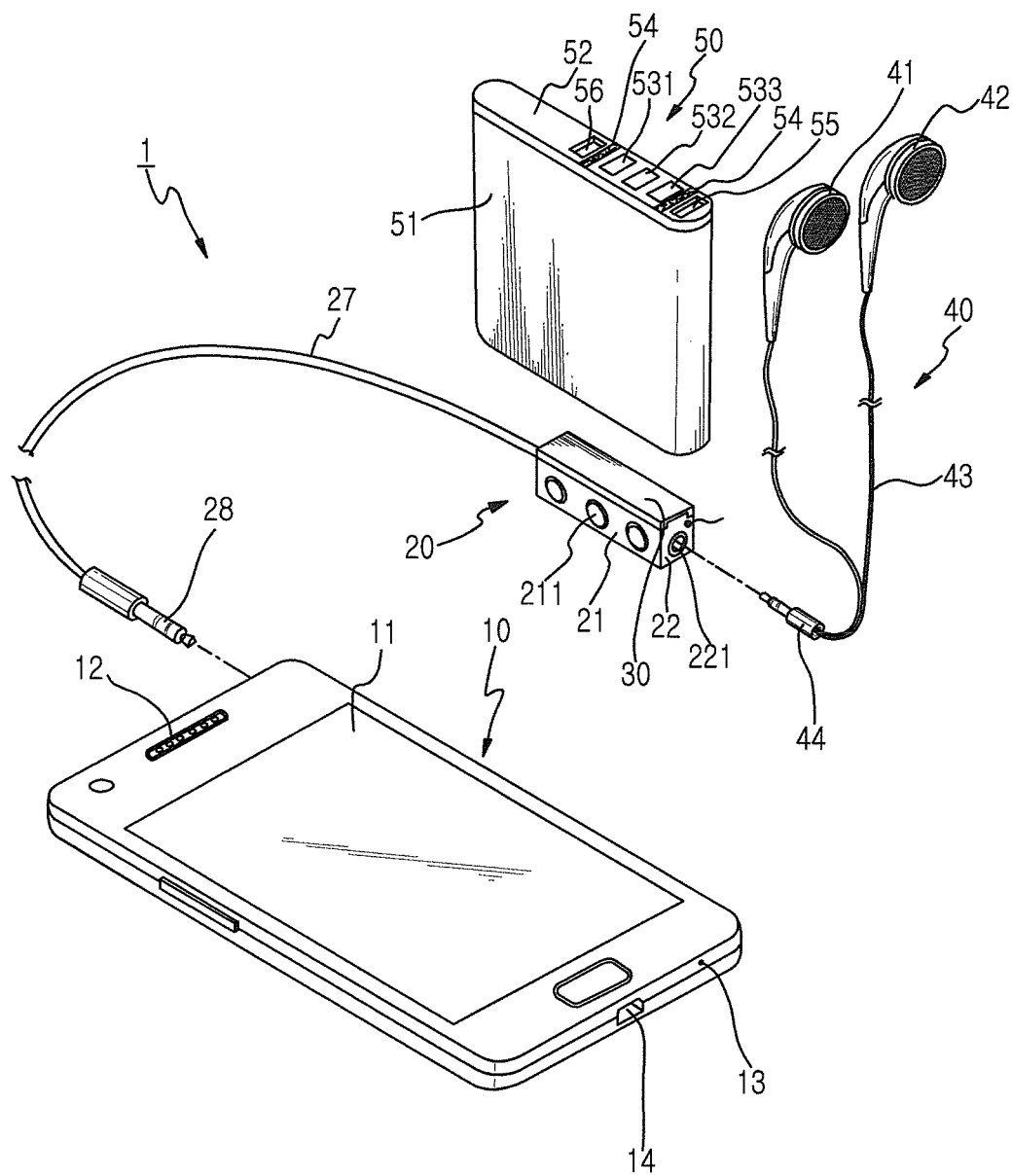
FIG. 1 illustrates an example charge apparatus for an electronic apparatus according to certain embodiments of the present invention.
Figure 2:
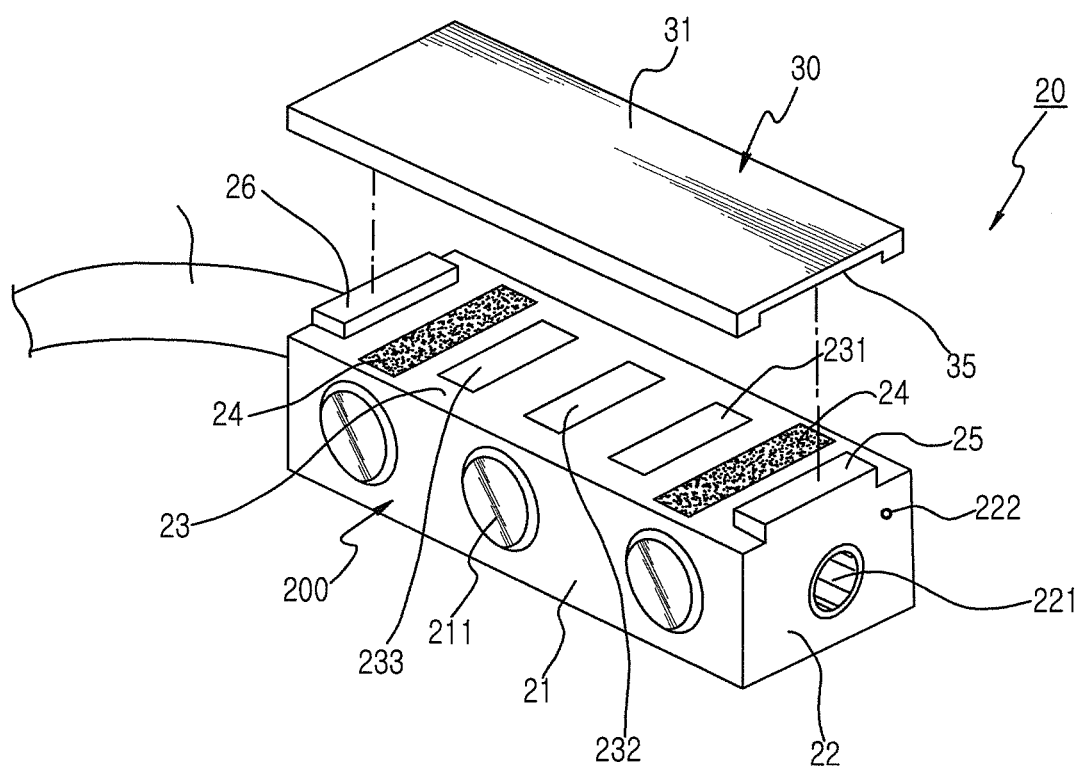
FIG. 2 illustrates an example earphone connection unit used in the charge apparatus of FIG. 1.

FIG. 1 illustrates an example charge apparatus 1 for an electronic apparatus according to certain embodiments of the present invention, and FIG. 2 illustrates an example earphone connection unit 20 used in the charge apparatus of FIG. 1. In the present invention, the portable terminal 10 for communication is illustrated and described as one particular embodiment of the electronic apparatus. The portable terminal 10 may includes additional or fewer elements without departing from the spirit and scope of the present invention.

Referring to FIGS. 1 and 2, a portable terminal 10 and an earphone connection unit 20 coupled to the portable terminal 10 may be used to charge a spare battery pack 50.

In the portable terminal 10, a display unit 11 may be installed at a front side. An ear-piece 12 may be installed over the display unit 11, and a microphone unit 13 may be installed under the display unit 11. A connector port 14 may be installed at a bottom side of the portable terminal 10, so that data may be exchanged with a personal computer (PC) through a data cable, and a battery pack installed in the portable terminal 10 may be charged through a traveler adapter (TA).

In general, the earphone connection unit 20 may be carried by a user to hear music or view a video through the portable terminal 10. Thus, the earphone connection unit 20 can also be used to charge the spare battery pack 50.

The earphone connection unit 20 may include a body 21 and a connection unit cable 27. The connection unit cable 27 may extend from the body 21 to a specified length, with an ear jack connector 28 installed at an end thereof. Herein, the ear jack connector 28 may use a 3.5 millimeter cylindrical ear jack; however, the present invention is not limited thereto. For example, the ear jack connector 28 may also use various connectors such as a 10-pin connector and a 24-pin connector. However, these connectors may also include audio left (A_L), audio right (A_R), a ground (GND), and a microphone (MIC) terminals for hearing music or generating an audio signal via the MIC terminal.

According to certain embodiments, the user may hear music by plugging an ear jack 44 of an earphone unit 40 into an ear jack hole 221 disposed at one side of the earphone connection unit 20. The earphone unit 40 may use a commercially available earphone unit. That is, a right speaker (SPK_R) 41 and a left speaker (SPK_L) 42 for stereo hearing may be included at ends of a predetermined length of earphone cable 43. Thus, the user may hear music by connecting the earphone unit 40 by the earphone connection unit 20 in a normal mode.

On the other hand, in order to charge the spare battery pack 50, the user may disconnect the earphone unit 40 from the earphone connection unit 20 and then directly coupled the earphone connection unit 20 to terminals 531, 532 and 533 disposed at a top side of the spare battery pack 50. In this case, it may be required to apply an external power to the connector port 14 of the portable terminal 10 through the TA.

The spare battery pack 50 may include a body 51 and a terminal installation side 52 that is a top side of the body 51. In general, terminals 531, 532 and 533 for charging may be disposed at the terminal installation side 52. For example, the terminals 531, 532 and 533 may include a battery (VBAT) terminal, a control function (C_F) terminal, and a GND terminal. Also, a connection guiding unit for suitable connection with the earphone connection unit 20 may be included at one side or both sides of the terminals 531, 532 and 533. Thus, as the connection guiding unit, two seating grooves 55 and 56 may be formed at the terminal installation side 52. Seating protrusions 25 and 26 of the earphone connection unit 20, which will be described later, may be seated in the seating grooves 55 and 56 so that the earphone connection unit 20 may be guided into a connection state for charging the spare battery pack 50. Also, one seating groove 55 or 56 may be installed, and two or more seating grooves may be foamed for the purpose of more stability. In certain embodiments, the seating grooves 55 and 56 may be formed at the spare battery pack 50, and the seating protrusions 25 and 26 may be formed at the earphone connection unit 20. In certain embodiments, the seating protrusions 25 and 26 may be formed at the spare battery pack 50, and the seating grooves 55 and 56 may be formed at the earphone connection unit 20.

However, the connection guiding unit is not limited to an engagement structure of the seating grooves and the seating protrusions as shown. For example, a separate guide unit may be used. For example, a guide slit may be formed at the spare battery pack, and a guide rib guided by the guide slit may be found at the earphone connection unit, so that the spare battery pack and the earphone connection unit may be coupled by the sliding coupling of the guide slit and the guide rib.

On the other hand, the earphone connection unit 20 and the spare battery pack 50 may further include a fixing unit whose position is fixed in a connection state. As illustrated, a pair of magnets 54 may be installed at the terminal installation side 52 of the spare battery pack 50, and a pair of magnets 24 may be installed at corresponding positions of the earphone connection unit 20, so that the earphone connection unit 20 may maintain a closely fixed state with the terminal installation side 52 of the spare battery pack 50 by the magnetic force therebetween. One or more magnets 24 and 54 may be installed at different positions according to the magnetic force. However, the present invention is not limited thereto. For example, at least one magnet 24 may be installed at one of the earphone connection unit 20 and the terminal installation side 52 of the spare battery pack 50, and a metal material attracted by the magnetic force of the magnet 24 may be installed at the other of the earphone connection unit 20 and the terminal installation side 52 of the spare battery pack 50.

Also, not only a connection guiding function but also a fixing function may be performed by the guide slit and the guide rib described as the connection guiding unit.

The above-described connection guiding unit and fixing unit may use a known locking structure or fixing structure. For example, various units may be used to maintain a connection state of the earphone connection unit 20 at a top side of the spare battery pack 50 in order to charge the spare battery pack 50.

The earphone connection unit 20 may be used to connect the earphone unit 40 for music hearing or to charge the spare battery pack 50, and may also be used as an ear microphone unit. Thus, at the outside of the body 21, a microphone unit 222 may be further installed, and a plurality of buttons for control of the portable terminal may be further installed.

Figure 3:
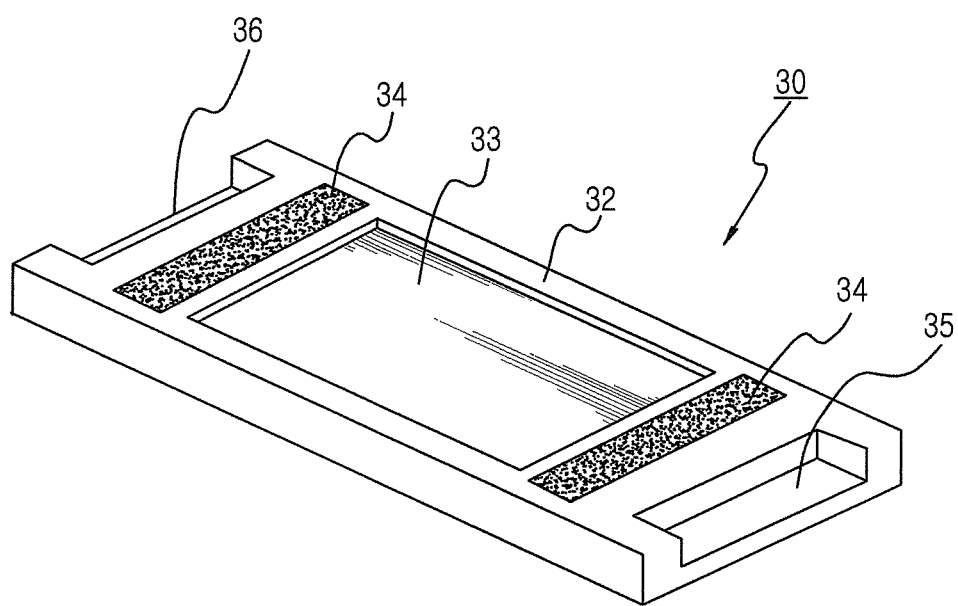
FIG. 3 illustrates an example cover coupled to an earphone connection unit used in the charge apparatus of FIG. 1.

FIG. 3 illustrates an example cover 30 coupled to the earphone connection unit 20 used in the charge apparatus 1 of FIG. 1.

Referring to FIG. 3, the earphone connection unit 20 may further include a cover 30. The cover 30 may be used to protect a terminal contact side 23 from external contamination when the earphone connection unit 20 is not used for charging. Thus, a top side 31 of the cover 30 may be formed with a shape, color, and/or texture to have an external appearance of the earphone connection unit 20, and a bottom side 32 thereof may be formed to include terminal receiving grooves 33 for receiving terminals 231, 232 and 233 of the earphone connection unit 20. For example, the terminals 231, 232 and 233 installed at the earphone connection unit 20 may be formed to protrude slightly for easy connection with the terminals 531, 532 and 533 of the spare battery pack 50. Thus, the terminal receiving grooves 33 of the cover 30 may be formed to a depth that receives the protruding terminals 231, 232 and 233.

Also, at both sides of the terminal receiving grooves 33, concave grooves 35 and 36 may be formed to engage with the seating protrusions 25 and 26 protruding from the body 21 of the earphone connection unit 20. Also, a pair of magnets 34 may be installed at the bottom side 32 of the cover 30, so that the cover 30 and the earphone connection unit 20 may be fixed by the magnetic force between the magnets 34 and the magnets 24 disposed at the terminal contact side 23 of the earphone connection unit 20. This configuration can prevent the cover 30 from being separated from the earphone connection unit 20 without external force applied thereto. However, the present invention is not limited thereto. For example, a snap-fit locking mechanism may be used instead of the coupling of the magnets 24 and 34, and the cover 30 may be formed of a rubber or silicon material so that one side thereof may be fixed to the earphone connection unit 20.

Figure 4:
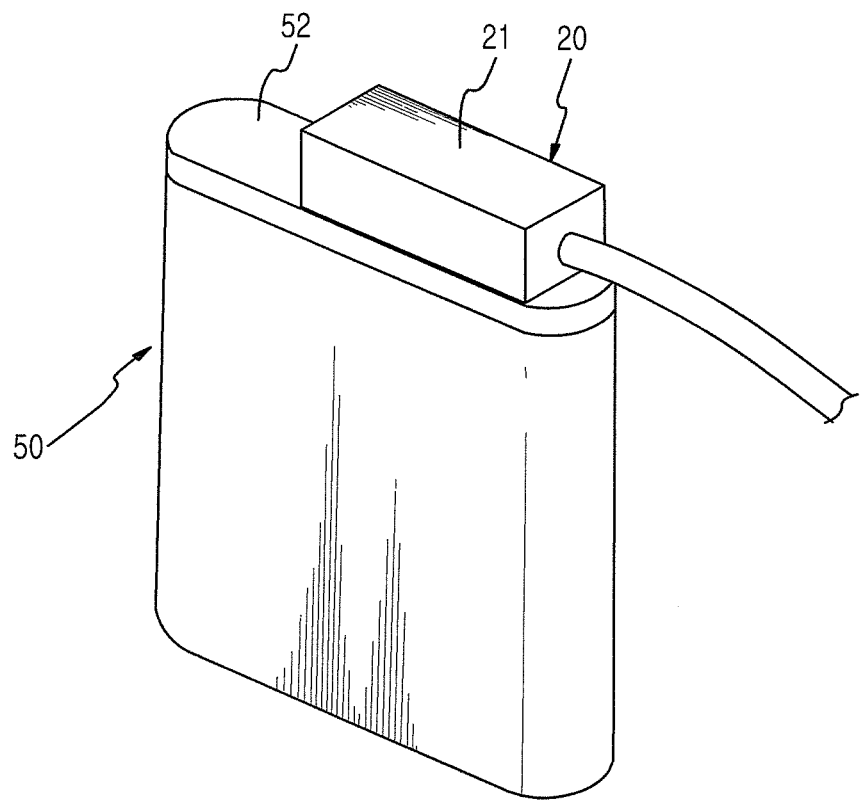
FIG. 4 illustrates an example state for charging a spare battery pack by an earphone connection unit used in the charge apparatus of FIG. 1.

FIG. 4 illustrates an example charging state configuration for charging the spare battery pack 50 by the earphone connection unit 20 used in the charge apparatus 1 of FIG. 1.

Thus, as illustrated in FIG. 4, when the user removes the cover 30 of the earphone connection unit 20 and mounts the earphone connection unit 20 on the top side (terminal installation side 52) of the spare battery pack 50, the seating protrusions 25 and 26 of the earphone connection unit 20 may be seated in the seating grooves 55 and 56 formed at the terminal installation side 52 of the spare battery pack 50, so that their positions may be aligned. This state may correspond to a state where the terminals 231, 232 and 233 of the earphone connection unit 20 are electrically coupled respectively to the terminals 531, 532 and 533 of the spare battery pack 50. Simultaneously, their positions may be closely fixed by the magnetic force between the magnets 54 provided at the terminal installation side 52 of the spare battery pack and the magnets 24 disposed at the terminal contact side 23 of the earphone connection unit 20, so that a charge operation may be performed on the spare battery pack 50.

For example, the A_L terminal of the ear jack connector 28 may correspond to the VBAT terminal of the spare battery pack 50, and the A_R terminal of the ear jack connector 28 may correspond to the C_F terminal of the spare battery pack 50.

Although the earphone connection unit 20 is selectively connected to the earphone unit 40 and the spare battery pack 50, the portable terminal 10 detects either of these and converts the internal charge circuit when a charge operation is performed. That is, since a built-in battery pack installed in the portable terminal 10 is also charged when the spare battery pack 50 is charged, the internal charge circuit can be changed.

Hereinafter, an internal configuration of the portable terminal 10 will be described.

Figure 5:
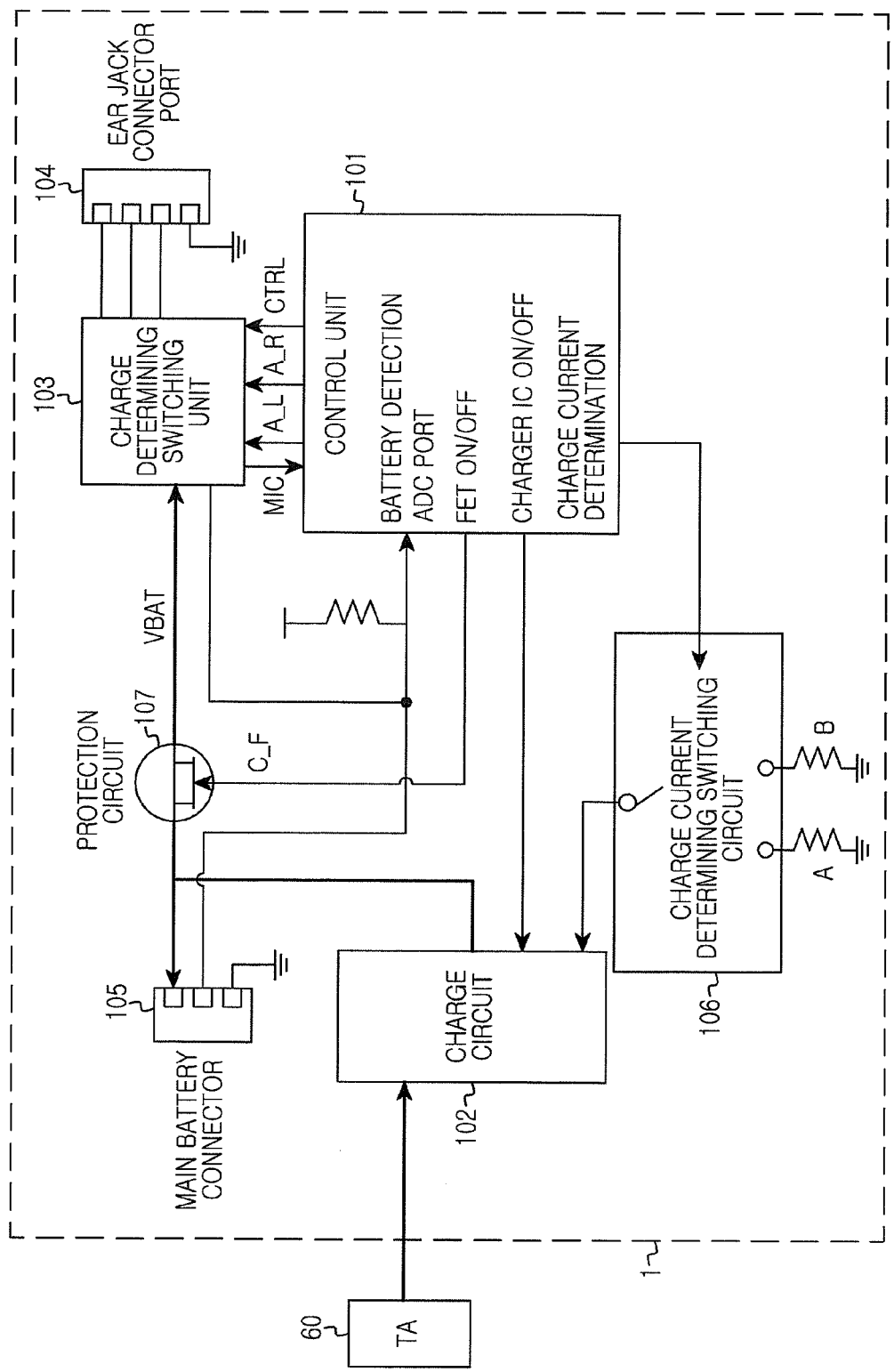
FIG. 5 illustrates an example electronic apparatus of FIG. 1 for charging a spare battery pack.
Figure 6:
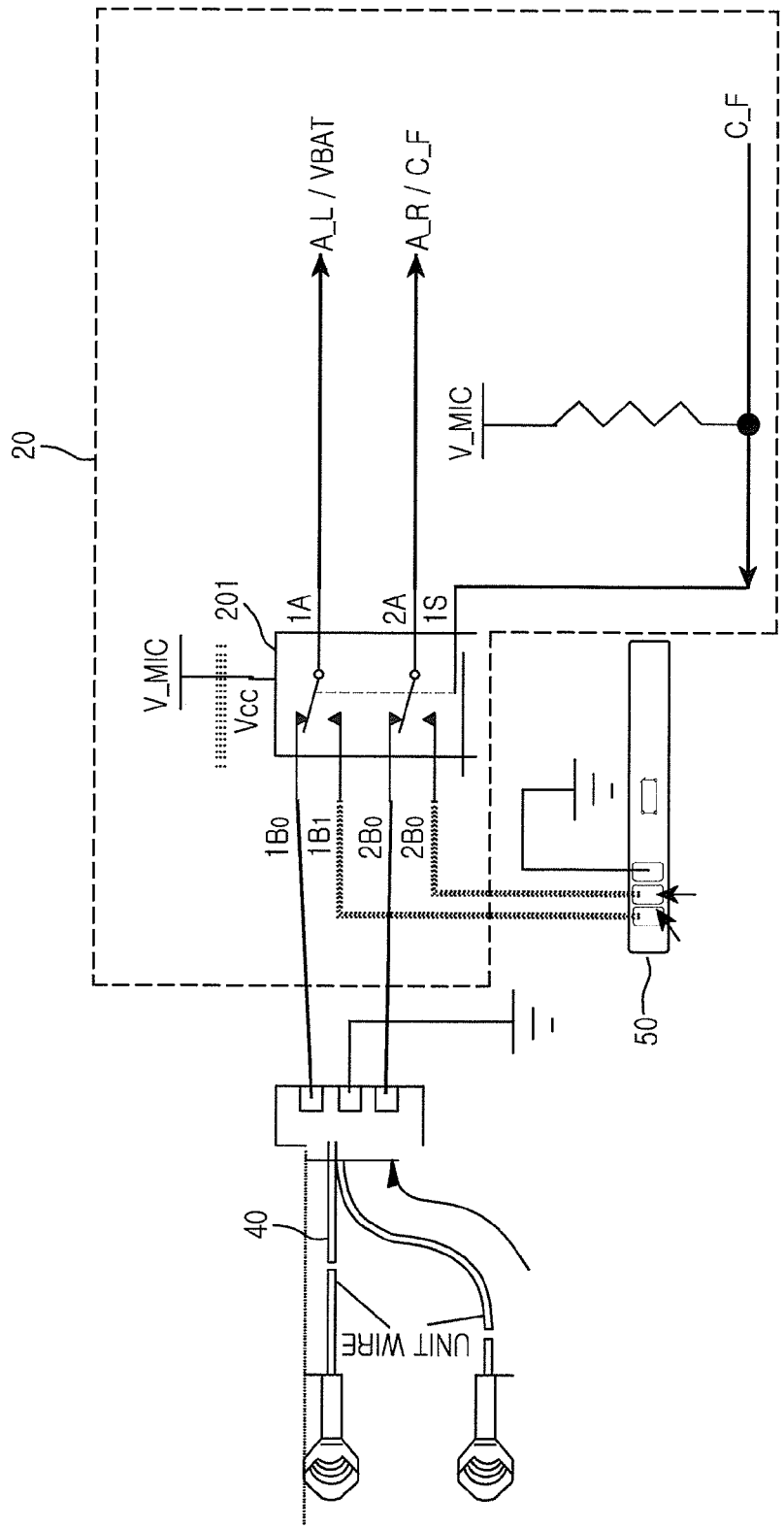
FIG. 6 illustrates an example earphone connection unit in the charge apparatus of FIG. 1.
Figure 7:
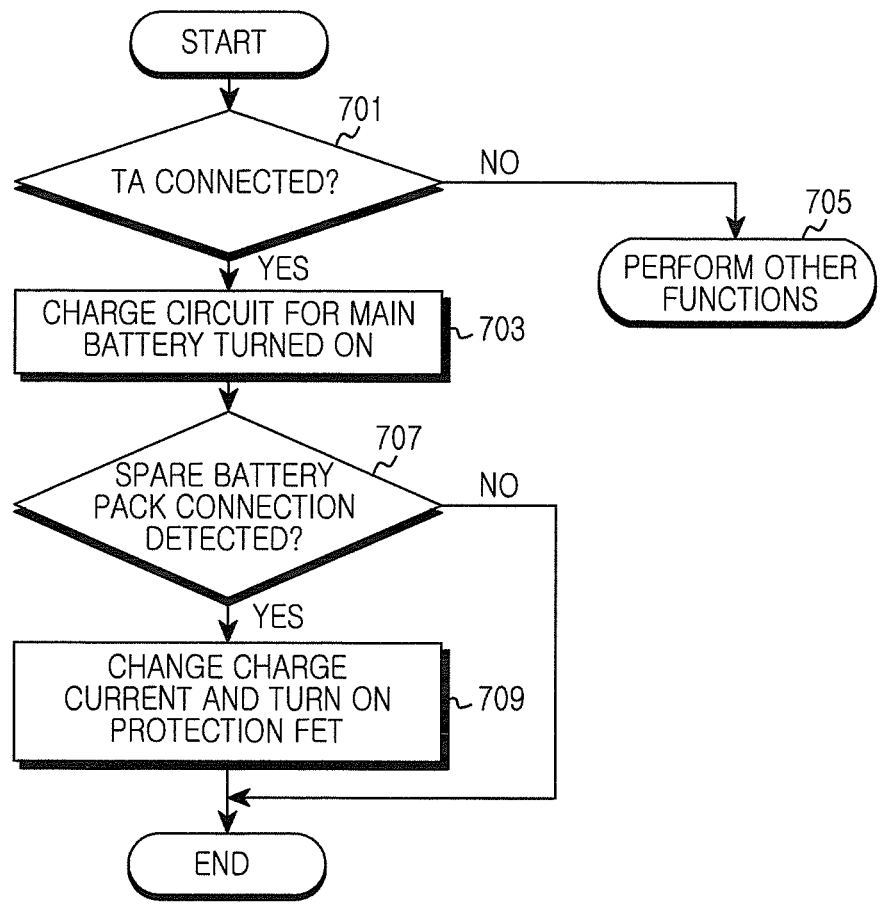
FIG. 7 illustrates an example process for charging a spare battery pack in the electronic apparatus of FIG. 1.

FIG. 5 illustrates an example internal configuration of the portable terminal 10 of FIG. 1 for charging the spare battery pack 50. FIG. 6 illustrates an example internal configuration of the earphone connection unit 20 in the charge apparatus 1 of FIG. 1. FIG. 7 illustrates an example process for charging the spare battery pack 50 in the portable terminal 10 of FIG. 1.

As illustrated in FIG. 5, the portable terminal 10 may include a control unit 101, a charge circuit 102, a charge determining switching unit 103, a charge current determining switching unit 106, and a protection circuit 107.

The control unit 101 may determine whether the portable terminal 10 is in an earphone mode or in a charge mode, by checking a signal applied to the ear jack connector 28 of the earphone connection unit 20 plugged into an ear jack connector port 104. When detecting the charge mode, the control unit 101 may switch the charge determining switching unit 103 to open a charge path using the protection circuit 107. Also, when detecting a connection of the TA, the control unit 101 may turn on the charge circuit 102 and switch the charge current determining switching unit 106. Also, the control unit 101 may turn on the protection circuit 107 disposed on the charge path.

Hereinafter, a charge process will be described with reference to FIG. 7. Referring to FIG. 7, in step 701, the control unit determines whether the TA is connected to the portable terminal. When detecting a connection of the TA, the control unit may turn on the charge circuit for a main battery pack in step 703. In this case, the main battery pack may be charged through the charge path by the charge circuit. In step 707, the control unit may determine whether the spare battery pack is connected through the earphone connection unit. Herein, an operation of detecting a charge operation of the spare battery pack through the earphone connection unit may include an operation of detecting a resistance value of the C_F terminal of the connected spare battery pack through an analog to digital converter (ADC) port in the control unit.

Thereafter, when detecting a connection of the spare battery pack, in step 709, the control unit may switch the charge determining switching unit 103 to connect the charge path and may control the charge current determining switching unit 106 to adjust a charge current in order to provide a resistance value capable of charging two battery packs simultaneously. For example, in FIG. 5, when a resistor A of the charge current determining switching unit 106 has a resistance value for 600 mA charging for charging only the main battery pack installed in the portable terminal, a resistor B of the charge current determining switching unit 106 may have a resistance value for 1200 mA charging for charging the main battery pack and the spare battery pack simultaneously.

In step 709, the control unit may also turn on the protection circuit 207. In one embodiment, the protection circuit is a FET. For safety of the user, the protection circuit may be disposed on the charge path for charging the spare battery pack in the charge circuit, so that a power path may not be connected even when the terminal of the spare battery pack protrudes to the outside.

FIG. 6 is an internal configuration diagram of the earphone connection unit 20 in the charge apparatus 1 of FIG. 1.

As illustrated in FIG. 6, the earphone connection unit 20 may include a switching unit 201. Herein, the switching unit 201 may serve to automatically perform a switching operation when a relevant unit (the spare battery pack or the earphone unit) is connected to any one of the terminal and the ear jack hole of the earphone connection unit 20.

This switching operation may be implemented by using a V_MIC bias voltage, which is applied when the ear jack body of the earphone unit is plugged into the ear jack hole of the earphone connection unit, as a driving voltage. Thus, as illustrated in FIG. 6, when the earphone unit is electrically coupled to the earphone connection unit, since it is connected to an audio path (A_L, A_R, V_MIC) and a resistance value of the C_F terminal of the spare battery pack is not connected, the control unit of the portable terminal may operate in the earphone mode.

The state where the spare battery pack and the ear jack of the earphone unit are electrically connected at different positions of the earphone connection unit are illustrated and described in the embodiments shown. However, when the ear jack of the earphone unit is implemented in the same way as the terminal of the spare battery pack, the earphone mode and the charge mode in the portable terminal may be separately controlled without the switching operation illustrated in FIG. 6.

According to the present invention, when the earphone connection unit without a separate charger is coupled to the spare battery pack is detected, the charge circuit of the electronic apparatus is used to charge the spare battery pack. Accordingly, the portability can be improved, the manufacturing cost can be reduced, and the convenience of use can be improved according to certain embodiments.

It will be apparent that there are various methods that can modify the above embodiments while falling within the scope of the following claims. That is, there may be various methods that can implement the present invention without departing from the scope of the following claims.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus configured to charge a spare battery pack for an electronic apparatus, the apparatus comprising:
   an earphone connection unit coupled to an electronic apparatus and configured to selectively receive at least one of an earphone unit for an earphone mode and the spare battery pack for a charge mode;
   a charge determining switching unit configured to switch to one of the earphone mode and the charge mode according to the unit coupled electrically to the earphone connection unit;
   a charge circuit configured to open a charge path for charging the spare battery pack with an external voltage applied to the electronic apparatus, according to the switching of the charge determining switching unit; and
   a control unit configured to measure a resistance value of the spare battery pack applied to the charge determining switching unit, switch the mode, and open the charge circuit.

2. The apparatus of claim 1, further comprising a charge current determining switching unit configured to adjust a charge current to charge the spare battery pack together with an internal battery pack of the electronic apparatus when the spare battery pack is coupled to the earphone connection unit.

3. The apparatus of claim 1, wherein a protection field effect transistor (FET) is further configured in the charge path, the FET configured to disconnect a power path when a charge terminal is exposed.

4. The apparatus of claim 1, wherein, in the earphone connection unit, a portion for coupling of the earphone unit has the same structure as a portion for coupling of the spare battery pack.

5. The apparatus of claim 1, wherein a portion for coupling of the earphone unit and a portion for coupling of the spare battery pack are configured at different positions in the earphone connection unit.

6. The apparatus of claim 5, wherein the earphone connection unit comprises:
a body;
unit terminals installed at a terminal contact side of the body, corresponding to terminals of the spare battery pack; and
an ear jack hole installed at a side of the body is configured to receive an ear jack of the earphone unit.

7. The apparatus of claim 6, further comprising a connection guiding unit disposed at the terminal contact side that is configured to provide coupling between terminals of the earphone connection unit and the terminals of the spare battery pack.

8. The apparatus of claim 7, wherein the connection guiding unit comprises at least one seating protrusion that protrudes from the terminal contact side to a predetermined height and is seated in a seating groove formed at a terminal installation side of the spare battery pack.

9. The apparatus of claim 6, further comprising a fixing unit configured to fix the earphone connection unit to the spare battery pack in a charge operation.

10. The apparatus of claim 9, wherein the fixing unit comprises at least one magnet configured on the terminal contact side of the earphone connection unit, and the earphone connection unit and the spare battery pack are fixed by a magnetic force between the at least one magnet and a magnet configured at the terminal installation side of the spare battery pack.

11. The apparatus of claim 5, wherein a cover is configured to be installed at the terminal contact side of the earphone connection unit to protect the unit terminals when the earphone connection unit is used in the earphone mode.

12. The apparatus of claim 11, wherein a terminal receiving groove is configured to receive the unit terminals and is formed at a side of the cover contacting the terminal contact side.

13. The apparatus of claim 5, wherein a switching unit is configured to switch to the earphone mode by a specified bias voltage of the connected earphone unit and is configured to be installed in the earphone connection unit.

14. An electronic apparatus configured to determine an earphone mode or a charge mode for an earphone unit and a spare battery pack that are selectively connected, electronic apparatus comprising:
an earphone connection unit coupled to an electronic apparatus and configured to selectively receive the earphone unit and the spare battery pack;
a charge determining switching unit configured to perform a mode change according to a type of the unit connected to the earphone connection unit;
a charge circuit configured to open a charge path for charging the spare battery pack with an external voltage applied to the electronic apparatus, according to the switching of the charge determining switching unit; and
a control unit configured to measure a resistance value of the spare battery pack applied to the charge determining switching unit, switch the mode, and open the charge circuit.

15. The electronic apparatus of claim 14, further comprising a charge current determining switching unit configured to adjust a charge current to charge the spare battery pack together with an internal battery pack of the electronic apparatus when the spare battery pack is coupled to the earphone connection unit.

16. The electronic apparatus of claim 14, wherein a protection field effect transistor (FET) is further disposed on the charge path and is configured to disconnect the spare battery pack when a charge terminal is exposed.

* * * * *